(12) United States Patent
Roberts

(10) Patent No.: US 7,660,496 B2
(45) Date of Patent: Feb. 9, 2010

(54) STRUCTURAL JOINT STRAIN MONITORING APPARATUS AND SYSTEM

(75) Inventor: Richard Damon Goodman Roberts, Southampton Hampshire (GB)

(73) Assignee: Schlumberger Technology Corporation, Houston, TX (US)

( * ) Notice: Subject to any disclaimer, the term of this patent is extended or adjusted under 35 U.S.C. 154(b) by 163 days.

(21) Appl. No.: 11/721,083

(22) PCT Filed: Nov. 30, 2005

(86) PCT No.: PCT/GB2005/004581

§ 371 (c)(1),
(2), (4) Date: Jun. 7, 2007

(87) PCT Pub. No.: WO2006/064181

PCT Pub. Date: Jun. 22, 2006

(65) Prior Publication Data

US 2009/0052832 A1 Feb. 26, 2009

(30) Foreign Application Priority Data

Dec. 16, 2004 (EP) ................................ 04029818

(51) Int. Cl.
*G02B 6/44* (2006.01)
(52) U.S. Cl. .......................................... 385/13; 385/44
(58) Field of Classification Search ................... 385/13, 385/44
See application file for complete search history.

(56) References Cited

U.S. PATENT DOCUMENTS

| | | | |
|---|---|---|---|
| 4,469,138 A | * | 9/1984 | Satoh .......................... 138/174 |
| 5,551,484 A | * | 9/1996 | Charboneau ................. 138/104 |
| 5,845,033 A | * | 12/1998 | Berthold et al. ............... 385/12 |
| 6,308,649 B1 | | 10/2001 | Gedeon |
| 6,543,296 B1 | | 4/2003 | Bermudez |

FOREIGN PATENT DOCUMENTS

| | | |
|---|---|---|
| EP | 0 825 377 A1 | 8/1997 |
| EP | 0 942 274 A2 | 9/1999 |

(Continued)

OTHER PUBLICATIONS

PCT Search Report dated Jan. 17, 2006 of Patent Application No. PCT/GB2005/004581 filed Nov. 30, 2005.

*Primary Examiner*—Jerry T Rahll
(74) *Attorney, Agent, or Firm*—Vern Maine & Associates

(57) ABSTRACT

Structural joint strain monitoring apparatus 92 comprises jacket means 52 in the form of first and second jacket elements 62, each having a primary jacket part 62a and substantially perpendicular secondary jacket part 62b which together define a compartment for receiving a joint, between two pipes 54, 56, to be monitored. The jacket means 52 additionally comprises two primary web elements 76, 78 provided between the primary and secondary jacket parts 62a, 62b. Three fiber Bragg grating (FBG) strain sensors 96, 98, 100 and an FBG temperature sensor 102 are provided within an optical fiber 104, bonded to the primary web elements 76, 78 and each end of the second jacket element 62 respectively, for measuring strain or temperature at their respective locations. The FBG sensors 96, 98, 100, 102 are optically coupled, via optical fiber 104, to optical fiber sensor interrogation apparatus 94, operable to interrogate each FBG sensor.

24 Claims, 5 Drawing Sheets

FOREIGN PATENT DOCUMENTS

| | | |
|---|---|---|
| EP | 1 635 034 A1 | 3/2006 |
| FR | 2688584 | 3/1992 |
| GB | 1197318 | 7/1970 |
| GB | 2400171 A | 10/2004 |
| JP | 2000111319 | 4/2000 |
| WO | 00/00799 | 1/2000 |
| WO | 03/038391 A2 | 5/2003 |

\* cited by examiner

STRUCTURAL JOINT STRAIN MONITORING APPARATUS AND SYSTEM

FIELD OF THE INVENTION

The invention relates to structural joint strain monitoring apparatus and to a structural joint strain monitoring system incorporating the apparatus.

BACKGROUND OF THE INVENTION

Oil and gas extraction pipelines generally include joints between sections of pipe and between the main pipe and bypass pipes. The flow of oil or gas within such pipes can cause vibrations within the pipes and relative movement between pipes at joints. These vibrations and movement can ultimately lead to damage or failure of the joint. It is desirable to be able to monitor the physical conditions (such as strain) experienced at pipe joints. These measurements should ideally be available in real time in order that conditions causing high loads and potential failure can be identified. Current practice within the oil and gas industries, includes monitoring pipe joints by visual inspection using remotely operated vehicles (ROVs) or using intelligent pigs travelling within the pipes themselves. These pigs can measure structural parameters such as corrosion, cracks and pipe thickness. Both ROVs and pigs can only provide intermittent measurements, and inspection using these methods is costly. Pipe joints are also monitored using electrical strain gauges, inclinometers and accelerometers located on the pipes.

SUMMARY OF THE INVENTION

According to a first aspect of the invention there is provided structural joint strain monitoring apparatus comprising:
  jacket means for location around at least part of a joint between structural members to be monitored, the jacket means closely receiving at least part of the joint; and
  an optical fibre strain sensor mechanically coupled to the jacket means at a measurement location,
  the optical fibre strain sensor to be optically coupled to optical fibre strain sensor interrogation apparatus operable to optically interrogate the optical fibre strain sensor.

The joint may be a joint between two structural members. The joint may be a straight joint. The joint may alternatively be a T-joint, between two generally perpendicular structural members.

The jacket means may comprise a jacket element of a complimentary size and shape to the at least part of the joint to be received therein, and fixing means for fixing the jacket element in position around the at least part of the joint. The jacket element may be of a size and shape that, in use, it extends approximately one half of the way around the joint.

Where the joint is a T-joint, the jacket element may be a complimentarily T-shaped jacket element, comprising primary and secondary hemi-cylindrical parts, the secondary part extending generally perpendicularly from the primary part.

The jacket means may further comprise a primary web element extending between first and second points on the jacket element. The primary web element may extend between the primary and secondary parts of a T-shaped jacket element, generally within a first plane. A primary web element may be provided generally within the first plane between the secondary part and the primary part on each side.

The jacket means may further comprise a secondary web element extending between the primary and secondary parts of a T-shaped jacket element, generally within a second plane which is generally orthogonal to the first plane.

The jacket means may comprise a second jacket element of a complimentary size and shape to the remaining part of the joint to be received therein, and may be of the same size and shape as the jacket element, such that the jacket means encases the joint. A secondary web element may be additionally provided on the second jacket element.

The jacket elements may be mechanically connected to one another, such that the jacket means may be opened to receive a joint and subsequently closed around the joint. The jacket elements may be connected to one another by hinge means, such as a strap hinge or a piano hinge, such that the two jacket elements are hinged together in a clam-shell type arrangement.

The jacket means may alternatively comprise a plurality of jacket elements which together define a compartment of complimentary size and shape to the joint, such that the jacket means encases the joint.

The fixing means may comprise mechanical fastening means, such as strapping or bolts, magnetic fastening means, such as a magnetic clamp, or adhesive.

Each jacket element is preferably constructed from a composite material, such as glass fibre or carbon fibre in an epoxy resin or a polyester resin.

The jacket means may have a lower mechanical strength than the structural joint such that the jacket means does not interfere with any movement of the joint, and any such movement is translated into strain within a jacket element and/or the or each web element.

The jacket means may alternatively have an equal or higher mechanical strength than the structural joint, such that the jacket means additionally provides structural support and/or reinforcement to the joint.

The apparatus may comprise a plurality of optical fiber strain sensors, each mechanically coupled to the jacket means at a respective measurement location on a jacket element or on a web element. The apparatus may additionally comprise one or more optical fiber temperature sensors provided on or within the jacket means.

Each optical fibre strain sensor may comprise a fibre grating strain sensor. The fibre grating strain sensor may be a fibre Bragg grating or may be a fibre Bragg grating Fabry-Perot etalon. Each optical fibre strain sensor may alternatively comprise an optical fibre Fabry-Perot etalon.

Each optical fibre temperature sensor may comprise a fibre grating temperature sensor. The fibre grating temperature sensor may be a fibre Bragg grating or may be a fibre Bragg grating Fabry-Perot etalon. Each optical fibre temperature sensor may alternatively comprise an optical fibre Fabry-Perot etalon.

Each grating or etalon may have substantially the same resonant wavelength or may have a different resonant wavelength.

The structural members may be substantially hollow structural members, such as pipes, or solid structural members, such as rods or bars. The pipes may be sub-sea pipes, such as pipes within sub-sea oil or gas pipelines.

According to a second aspect of the invention there is provided a structural joint strain monitoring system comprising:
  structural joint strain monitoring apparatus according to the first aspect of the invention; and optical fibre strain sensor interrogation apparatus operable to optically interrogate each optical fibre strain sensor and any optical fiber temperature sensor.

The optical fibre strain sensor interrogation apparatus may be operable to determine the resonant wavelength of each optical fibre strain sensor and any optical fiber temperature sensor.

DETAILED DESCRIPTION OF THE INVENTION

Figure 1:
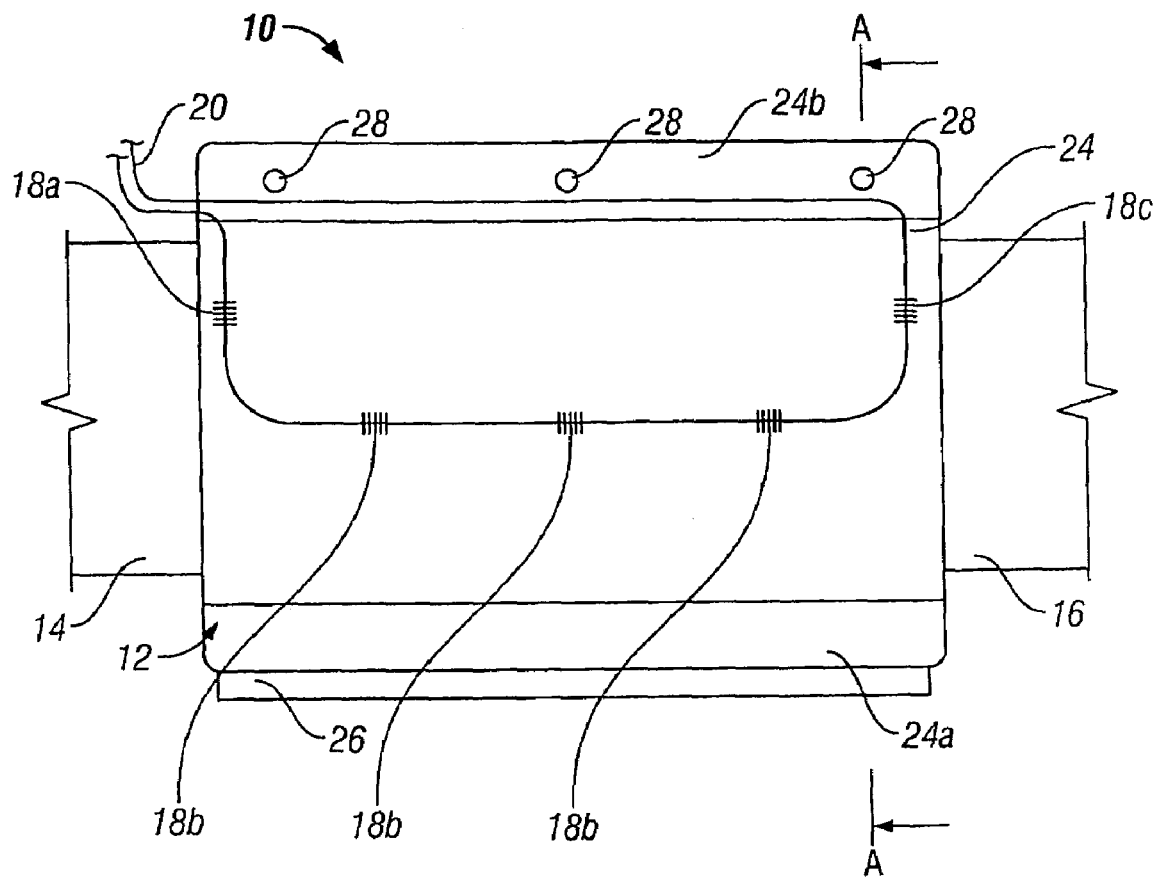
FIG. 1 is a diagrammatic plan view of structural joint strain monitoring apparatus according to a first embodiment of the invention, shown in use across a straight pipe joint.

The jacket means 12 comprises two jacket elements 22, 24 which together define a compartment of complimentary size and shape to the joint, such that the joint is closely received within the jacket means 12. Each jacket element 22, 24 is provided with a flange 22a, 22b and 24a, 24b along each side. The jacket means 12 is fabricated in a carbon fibre/epoxy resin composite material.

The jacket elements 22, 24 are mechanically connected to one another by a piano hinge 26 provided along the flanges 22a, 24a on one side of the jacket elements 22, 24, such that the jacket elements 22, 24 are hinged together in a clam-shell type arrangement. The hinge 26 enables the jacket elements 22, 24 to be moved apart from one another, in the directions of the arrows in FIG. 2, to thereby open the jacket means 12 for receiving the pipe joint. The jacket means 12 is subsequently closed by opposite movement of the jacket elements 22, 24, thereby enclosing the pipe joint.

The jacket means 12 further comprises mechanical fastening means, in the form of bolts 28 for location through apertures 30 provided in the flanges 22b, 24b on the other side of the jacket elements 22, 24, for fastening the jacket means closed around the pipe joint.

The FBG strain sensors 18 are mechanically coupled to one jacket element 24 at a plurality of measurement locations. In this example, one FBG strain sensor 18a extends generally across the jacket element 24 at one end, and thus across the first pipe 1, three FBG strain sensors 18b extend generally axially along the jacket element 24, across the joint between the two pipes 14, 16, and one FBG strain sensor 18c extends generally across the jacket element 24 at the other end, and thus across the second pipe 16. In this example the optical fibre 20 containing the FBGs 18 is mechanically bonded to the external surface of the jacket element 24.

In this example, all of the FBG strain sensors 18 have the same resonant wavelength of 1550 nm and a spectral linewidth of 0.07 nm.

In use, the FBG strain sensors 18 are optically coupled to optical fibre grating interrogation apparatus operable to optically interrogate the FBG strain sensors 18. Suitable FBG interrogation apparatus will be well known to the person skilled in the art, and will not be described in detail here. One particularly suitable FBG interrogation apparatus is described in International patent application number PCT/GB2003/005497.

In this example, the FBG strain sensors 18 are to be used to measure strain within the jacket element 24, caused by expansion and/or movement of the pipes 14, 16 within the jacket means 12. From the measured strain readings from the three axially orientated FBG strain sensors 18b, the strain conditions across the joint can be determined. From the strain reading from the FBG strain sensors 18a, 18c orientated across the pipes, the flow rate of fluid through the joint pipes 14, 16 and internal pressure within the joint pipes 14, 16 can also be indirectly determined. From the measured strain conditions, the fatigue conditions and the remaining lifetime of the joint can be inferred.

The jacket means 12 of this example has a mechanical strength which is at least equal to the mechanical strength of the joint and can thus additionally be used to repair, strengthen or stiffen the joint.

Figure 3:
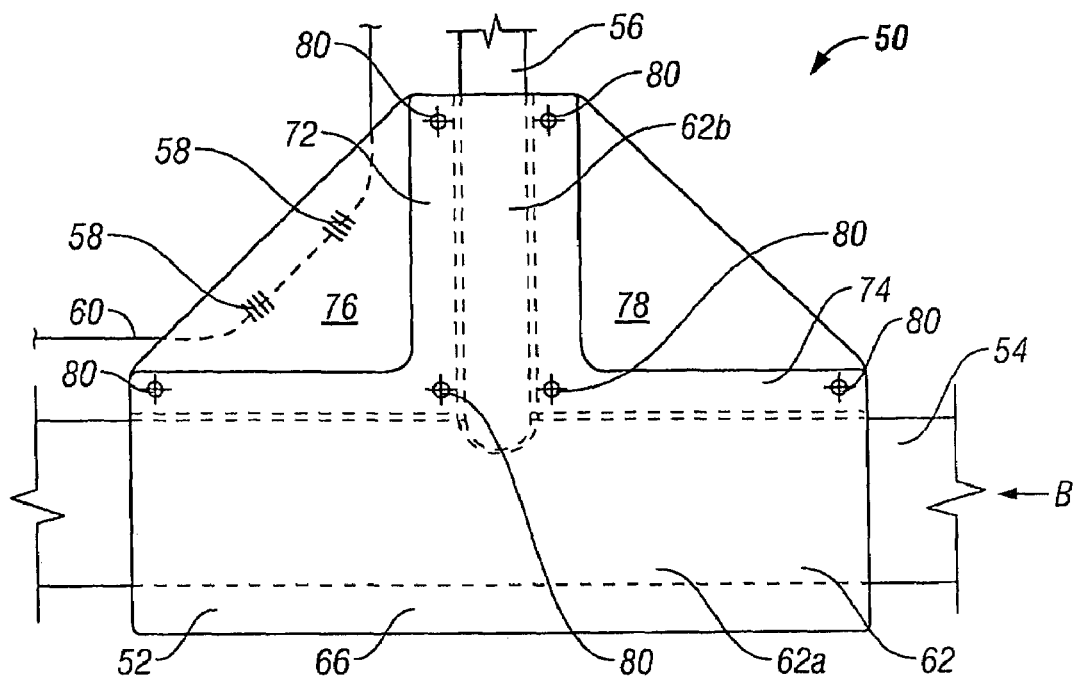
FIG. 3 is a diagrammatic plan view of structural joint strain monitoring apparatus according to a second embodiment of the invention, shown in use on a T-joint between two substantially perpendicular pipes.
Figure 4:
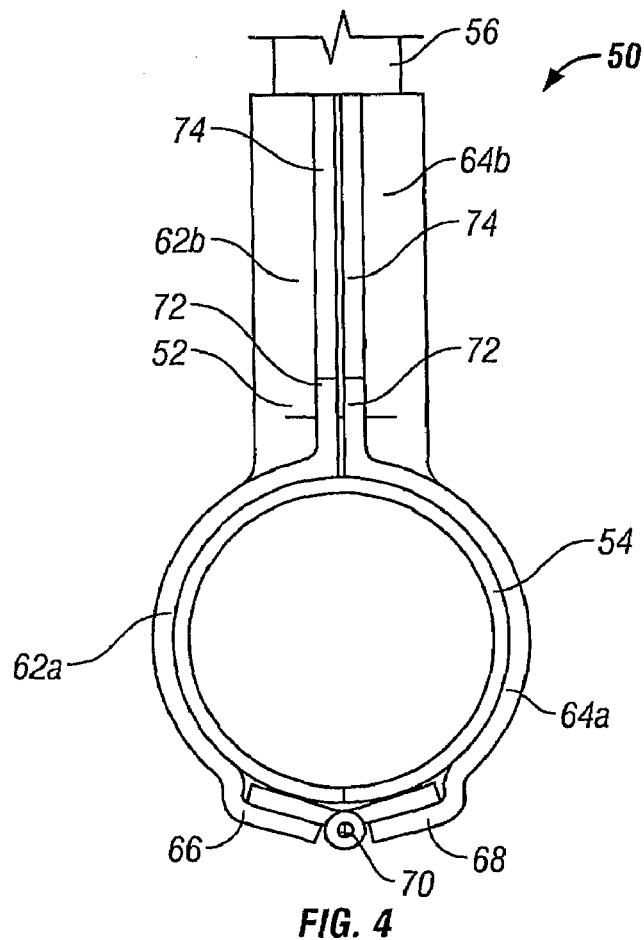
FIG. 4 is a diagrammatic end view, in the direction of arrow B, of the apparatus and pipes of FIG. 3.
Figure 5:
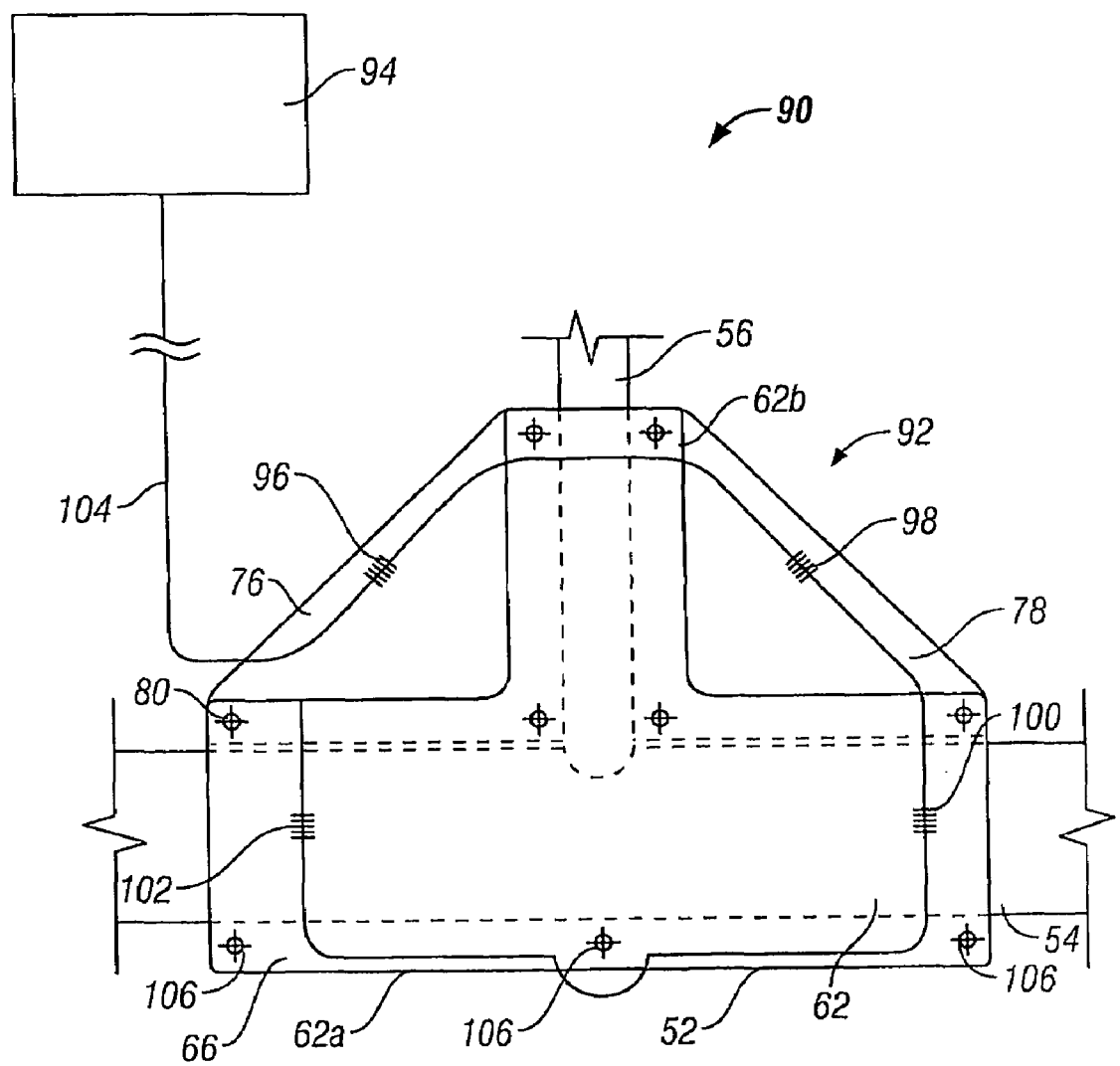
FIG. 5 is a diagrammatic representation of a structural joint strain monitoring system according to a third embodiment of the invention.

FIGS. 3 and 4 show structural joint strain monitoring apparatus 50 according to a second embodiment of the invention.

The apparatus 50 comprises jacket means 52, for location around a T-joint between two generally perpendicular pipes 54, 56, and two FBG strain sensors 58 provided within an optical fibre 60.

The jacket means 52 comprises two jacket elements 62, 64 which together define a generally T-shaped compartment of complimentary size and shape to the T-joint between the two pipes 54, 56, such that the T-joint may be closely received within the jacket means 52.

The jacket means 52 is fabricated in a glass fibre/polyester resin composite material and is designed to be sufficiently mechanically weak as to not interfere with any movement of the joint pipes 54, 56.

Each jacket element 62, 64 is generally T-shaped, having a primary hemi-cylindrical part 62a, 64a, for receiving the first pipe 54, and a secondary hemi-cylindrical part 62b, 64b extending generally perpendicularly outwardly from the first part 62a, 64a, for receiving the second pipe 56.

The jacket means preferably further comprises a primary web element extending between first and second points on the jacket means. The primary web element preferably extends between the primary and secondary parts of a T-shaped jacket element, most preferably generally within a first plane. A primary web element is preferably provided generally within the first plane between the secondary part and the primary part on each side.

A first flange 66, 68 is respectively provided along the straight edge of each jacket element primary part 62a, 64a.

The jacket elements 62, 64 are mechanically connected to one another by a strap hinge 70 provided between the flanges 66, 68 such that the jacket elements 62, 64 are hinged together in a clam-shell type arrangement. The hinge 70 enables the jacket elements 62, 64 to be moved apart from one another to thereby open the jacket means 52 for receiving the pipe joint.

The jacket means 52 is subsequently closed by opposite movement of the jacket elements 62, 64, thereby enclosing the pipe joint.

A second flange 72 is provided along the other edge of each jacket element 62, 64, and extends from one end (left hand end as shown in the drawings) of the jacket element primary parts 62a, 64a to their junctions with the secondary parts 62b, 64b, and outwardly along one side (left hand side as shown in the drawings) of the jacket element secondary parts 62b, 64b.

A third flange 74 is provided along the other edge of each jacket element 62, 64, and extends from its other end (right hand end as shown in the drawings) to their junctions with the secondary parts 62b, 64b, and outwardly along the other side (right hand side as shown in the drawings) of the jacket element secondary parts 62b, 64b.

The jacket means 52 further comprises first and second primary web elements 76, 78. The primary web elements 76, 78 are generally triangular in shape and are provided on the second jacket element 64. The primary web elements 76, 78 extend between the primary 64a and secondary 64b parts of the second jacket element 64, and are located generally within a first plane.

The optical fibre 60 containing the FBG strain sensors 58 is embedded within one primary web element 76.

The jacket means 52 additionally comprises fastening bolts 80, for location through apertures provided in the flanges 72, 74, for fastening the jacket means closed around the pipe joint.

In use, as the second pipe 56 experiences strain or moves relative to the first pipe 54, the strain or movement is transferred to the jacket elements 62, 64. The jacket elements 62, 64 translate any movement into strain in the primary web elements 76, 78, and the strain is detected by the FBG strain sensors 58. The strain conditions within the joint can thereby be determined.

As described above in connection with the first embodiment, the FBG strain sensors 58 are optically coupled to optical fibre grating interrogation apparatus operable to optically interrogate the FBG strain sensors 58.

Figure 6:
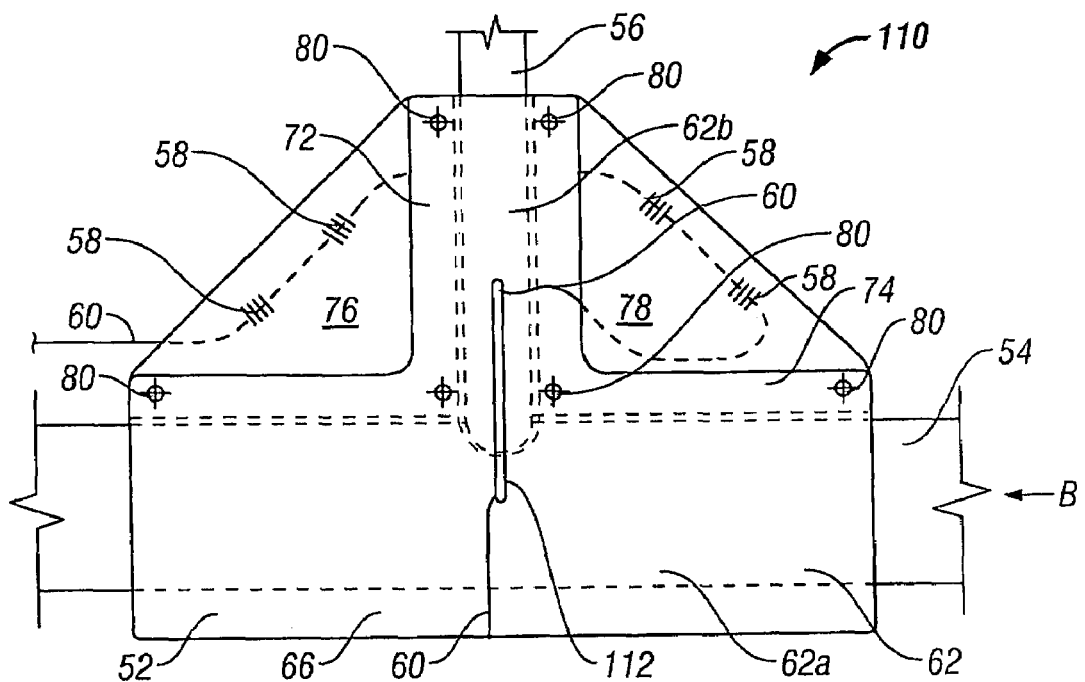
FIG. 6 is a diagrammatic plan view of structural joint strain monitoring apparatus according to a fourth embodiment of the invention, shown in use on a T-joint between two substantially perpendicular pipes.

A third embodiment of the invention, shown in FIG. 6, provides a structural joint strain monitoring system 90 comprising structural joint monitoring apparatus 92 and FBG strain sensor interrogation apparatus 94.

The structural joint strain monitoring apparatus 92 is substantially the same as the apparatus 50 of the previous embodiment, with the following modifications. The same reference numbers are retained for corresponding features.

In this embodiment, three FBG strain sensors 96, 98, 100 and one FBG temperature sensor 102 are provided within an optical fibre 104. All of the FBGs 96, 98, 100, 102 have the same resonant wavelength of 1550 nm and a spectral linewidth of 0.07 nm.

The first FBG strain sensor 96 is provided on one primary web element 76, the second FBG strain sensor 98 is provided on the other primary web element 78, and the third FBG strain sensor is provided at one end of the first jacket element 62. The FBG temperature sensor 102 is provided at the other end of the first jacket element 62.

The FBG sensors 96, 98, 100, 102 are optically coupled, via the optical fibre 104, to the interrogation apparatus 94, which is operable to optically interrogate each optical FBG sensor 96, 98, 100, 102. Suitable FBG sensor interrogation apparatus will be well known to the person skilled in the art, and so will not be described in detail here. One particularly suitable FBG interrogation apparatus is that described in International patent application number PCT/GB2003/005497.

In this embodiment the first and second jacket elements 62, 64 are not mechanically connected to each other. Rather they are separate pieces which are secured together once located around the joint. The jacket elements 62, 64 are secured together using connecting bolts 106 located through apertures formed in the flanges 66.

Figure 7:
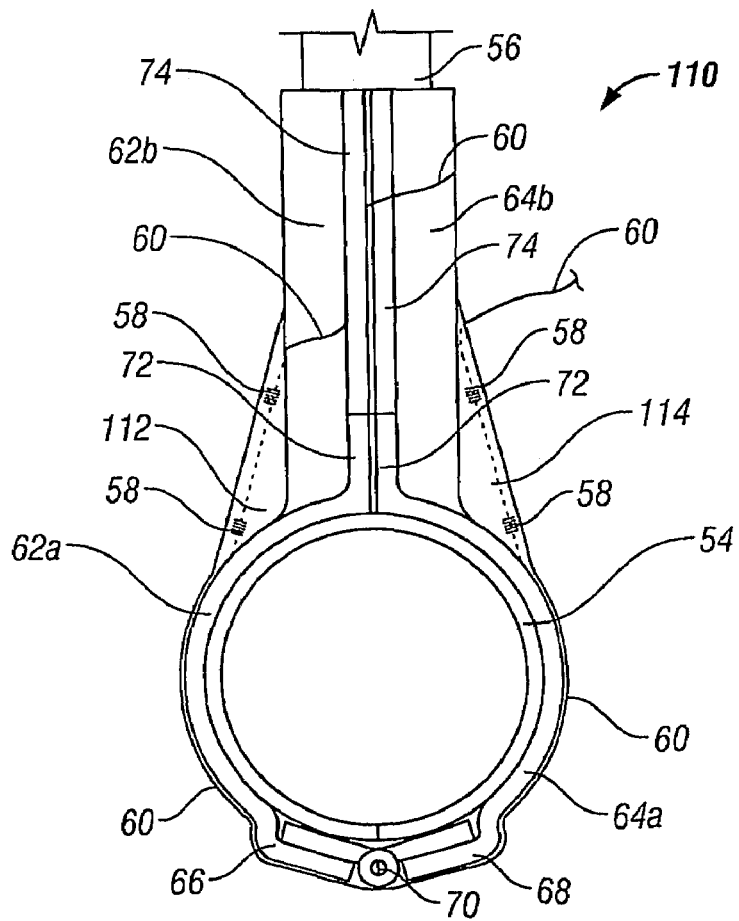
FIG. 7 is a diagrammatic end view, in the direction of arrow B, of the apparatus and pipes of FIG. 6.

FIGS. 6 and 7 show structural joint strain monitoring apparatus 110 according to a fourth embodiment of the invention. The apparatus 110 according to this embodiment is substantially the same as the apparatus 50 of the second embodiment, with the following modifications. The same reference numbers are retained for corresponding features.

In this embodiment the apparatus 110 further comprises two secondary web elements 112, 114. The secondary web elements 112, 114 are generally triangular in shape and extend between the secondary 62b, 64b and primary 62a, 64a parts of each jacket element 62, 64. The secondary web elements 112, 114 are located generally within the plane perpendicular to the plane of the primary web elements 76, 78.

Eight FBG strain sensors 58 are provided within the optical fibre 60, two in each of the primary web elements 76, 78 and two in each of the secondary web elements 112, 114. The fibre 60 and the FBG strain sensors 58 are embedded within each of the web elements 76, 78, 112, 114.

The provision of the secondary web elements 112, 114, and the FBG strain sensors 58 embedded within them, enables movement of the first pipe 56 relative to the second pipe 58 to be measured in two dimensions. A more detailed measurement of the strain within the joint between the pipes 56, 58 can therefore be obtained.

Figure 8:
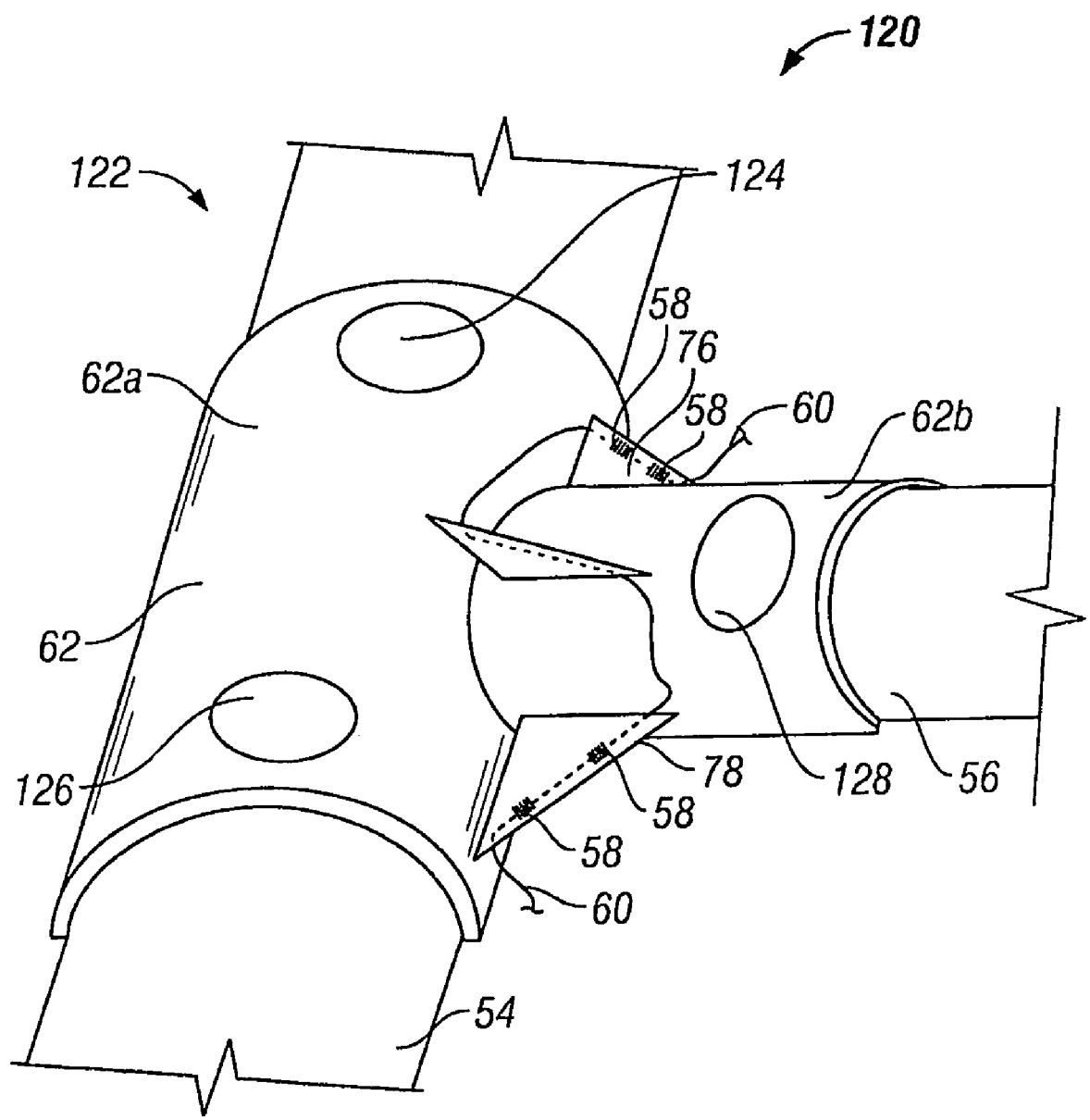
FIG. 8 is a diagrammatic representation of structural joint strain monitoring apparatus according to a fifth embodiment of the invention, shown in use on a T-joint between two substantially perpendicular pipes.

Structural joint strain monitoring apparatus 120 according to a fifth embodiment of the invention is shown in FIG. 8. The apparatus 120 according to this embodiment is substantially the same as the apparatus 110 of the fourth embodiment, with the following modifications. The same reference numbers are retained for corresponding features.

In this embodiment, the jacket means 122 comprises a single T-shaped jacket element 62 and fixing means in the form of magnetic clamps 124, 126, 128. Two primary web elements 76, 78 and a single secondary web element 112 are provided on the jacket element 62.

The primary part 62a of the jacket element 62 extends approximately half way around the first pipe 54 and the secondary part 62b of the jacket element 62 extends approximately half way around the second pipe 56. The jacket element 62 thereby receives approximately one half of the joint between the two pipes 54, 56.

First and second magnetic clamps 124, 126 are provided at each end of the primary part 62a of the jacket element 62, and a third magnetic clamp 128 is provided towards the distal end of the secondary part 62b of the jacket element 62. The magnetic clamps 124, 126, 128 magnetically couple the jacket element 62 onto the pipes 54, 56, which, in this example, include ferrous material.

In this example, six FBG strain sensors 58 are provided within the optical fibre 60, with two FBG strain sensors 58 being embedded within each of the primary web elements 76, 78 and the secondary web element 112.

Various modifications may be made to the described embodiments without departing from the scope of the invention. The or each jacket element may have a different size and shape to those described, and it will be appreciated that their size and shape will, at least in part, be determined by the size and shape of the joint with which the apparatus is intended to be used. Where two hinged jacket elements are described it will be appreciated that a different type of hinge to that described may be used. A greater number of jacket elements may be provided, connected by a correspondingly greater number of hinges.

Where the jacket elements are described as fastened or secured together using connecting bolts, these may be replaced by any suitable alternative mechanical fastenings or magnetic fastenings, or may be replaced by adhesive.

The jacket means may be fabricated from a different composite material to those described, and may have a different mechanical strength to those described.

The FBG strain sensors and FBG temperature sensors may be replaced by a different type of optical fibre sensor, such as a fibre Bragg grating Fabry-Perot etalon or an optical fibre Fabry-Perot etalon. The FBG sensors may have a different resonant wavelength and spectral linewidth to that described, and a different number of FBG strains sensors and FBG temperature sensors may be provided. The FBG sensors may be provided at different locations on the jacket means. Where the optical fibre and the FBG sensors are described as being bonded to a surface of the jacket means they may alternatively be embedded within the jacket means, and vice versa.

A different optical fibre grating sensor interrogation apparatus may be used, and it may alternatively be located close to the structural component monitoring apparatus, and in particular may be located within a housing provided on the jacket means.

The structural joint strain monitoring apparatus may be used in connection with different structural joints to those described. In particular, the apparatus may be used to monitor joints between solid structural members, such as rods or bars, rather than the described hollow structural members. The apparatus may also be used to monitor joints between three or more structural members.

The described embodiments provide various advantages, as follows. The structural joint strain monitoring apparatus enables the physical conditions within pipe joints to be monitored in real time allowing the conditions leading to high loads and potential failure of the joint to be identified. The monitored strain and/or temperature data can be recorded for structural health monitoring, such as residual life calculations, and can be used in real time to avoid or reduce the incidence of damaging conditions by process management, or design feedback. The measured strain and temperature data can also be used to carry out analysis of a variety of other parameters, including vibrations, pressure within joints, and flow speeds of fluids through joints. The fatigue conditions within a pipe joint and its remaining lifetime can thus be inferred.

The availability of real time, high speed strain and/or temperature information can be used to reduce the incidence of damaging loads or vibrations within a joint by active control mechanisms, thereby leading to extended life and reduced damage of joints. This can also improve the safety of pipelines, which in the case of oil or gas pipelines can help to minimise environmental danger due to joint failure.

The apparatus can be used to monitor any pipe joint, and also joints between solid structural members. The jacket means can additionally be used to provide structural support or reinforcement to the joint being monitored.

Although the structural joint strain monitoring apparatus is described in general use on pipes, it is envisaged that the apparatus would be of particular advantage when used on sub-sea pipes, such as those making up sub-sea oil or gas pipelines.

The jacket elements may be pre-moulded, and the optical fiber strain or temperature sensors coupled to them, in a quality controlled environment, to rigid specifications and can pre-tested before deployment.

The structural component monitoring apparatus and systems can be deployed on new structures or can be retrofitted on joints of existing structures. In the case of sub-sea pipelines, such as oil and gas pipelines, structural joint monitoring apparatus can be retrofitted sub-sea using a remotely operated vehicle (ROV).

Fibre optic sensors are intrinsically safe and can be used to monitor pipes joints between pipes carrying volatile fluids. Where the optical fibre containing the sensors is embedded within a composite structure, the fibre becomes part of the structure and there are no de-bond issues. In addition, the composite structure provides armouring and protection to the optical fibre sensors.

Due to the multiplexing capacity of optical fibre sensors, multiple sensors at a corresponding plurality of sensing locations can be interconnected using only optical fibre. Due to the low loss of optical fibre, the structural component monitoring apparatus can be located at a considerable distance (several kilometers) from the interrogation apparatus, thus permitting remote deployment at great water depth or along pipelines, tunnels or industrial plants.

The invention claimed is:

1. A structural joint strain monitoring system comprising:
   jacket means for receiving a T-shaped joint between hollow structural members to be monitored, the jacket means comprising a T-shaped jacket element of a complimentary size and shape for enclosing at least part of the joint to be received and fixing means for fixing the jacket element in position around the at least part of the joint, the jacket element comprising primary and secondary hemi-cylindrical parts, the secondary part extending generally perpendicularly from the primary part, and at least one web element extending between the first and second hemi-cylindrical parts; and
   at least one optical fibre strain sensor mechanically coupled to the jacket element at a measurement location, said optical fiber strain sensor configured to be optically coupled to an optical fiber strain sensor interrogation apparatus.

2. Apparatus as claimed in claim 1, wherein the structural members are substantially hollow structural members.

3. Apparatus as claimed in claim 2, wherein the hollow structural members are sub-sea pipes.

4. Structural joint strain monitoring apparatus comprising:
   jacket means for location around at least part of a T joint between two structural members to be monitored, the jacket means closely receiving at least part of the joint; and
   an optical fibre strain sensor mechanically coupled to the jacket means at a measurement location,
   the optical fibre strain sensor to be optically coupled to optical fibre strain sensor interrogation apparatus operable to optically interrogate the optical fibre strain sensor.

5. Apparatus as claimed in claim 4, wherein the jacket means comprises a jacket element of a complimentary size and shape to the at least part of the joint to be received therein, and fixing means for fixing the jacket element in position around the at least part of the joint.

6. Apparatus as claimed in claim 5, wherein the jacket element is of a size and shape that, in use, it extends approximately one half of the way around the joint.

7. Apparatus as claimed in claim 6, wherein the jacket element is a complimentarily T-shaped jacket element, comprising primary and secondary hemi-cylindrical parts, the secondary part extending generally perpendicularly from the primary part.

8. Apparatus as claimed in claim 7, wherein the jacket means further comprises a primary web element extending between first and second points on the jacket element.

9. Apparatus as claimed in claim 8, wherein the primary web element extends between the primary and secondary parts of a T-shaped jacket element, generally within a first plane.

10. Apparatus as claimed in claim 9, wherein the jacket means further comprises a secondary web element extending between the primary and secondary parts of a T-shaped jacket element, generally within a second plane which is generally orthogonal to the first plane.

11. Apparatus as claimed in claim 8, wherein the apparatus comprises a plurality of optical fiber strain sensors, each mechanically coupled to the jacket means at a respective measurement location on a jacket element or on a web element.

12. Apparatus as claimed in claim 11, wherein the apparatus additionally comprises one or more optical fiber temperature sensors provided on or within the jacket means.

13. Apparatus as claimed in claim 12, wherein each said optical fibre temperature sensor comprises a fibre grating temperature sensor.

14. Apparatus as claimed in claim 5, wherein the jacket means comprises a second jacket element of a complimentary size and shape to the remaining part of the joint to be received therein, such that the jacket means encases the joint.

15. Apparatus as claimed in claim 14, wherein a secondary web element is provided on the second jacket element.

16. Apparatus as claimed in claim 14, wherein the jacket elements are mechanically connected to one another, such that the jacket means may be opened to receive a joint and subsequently closed around the joint.

17. Apparatus as claimed in claim 16, wherein the jacket elements are connected to one another by hinge means, such as a strap hinge or a piano hinge, such that the two jacket elements are hinged together in a clam-shell type arrangement.

18. Apparatus as claimed in claim 5, wherein each jacket element is constructed from a composite material.

19. Apparatus as claimed in claim 5, wherein the fixing means comprises mechanical fastening means, magnetic fastening means, or adhesive.

20. Apparatus as claimed in claim 1, wherein the jacket means has an equal or higher mechanical strength than the structural joint, such that the jacket means additionally provides structural support and/or reinforcement to the joint.

21. Apparatus as claimed in claim 1, wherein the jacket means comprises a plurality of jacket elements which together define a compartment of complimentary size and shape to the joint, such that the jacket means encases the joint, and fixing means for fixing the jacket element in position around the joint.

22. Apparatus as claimed in claim 1, wherein the jacket means has a lower mechanical strength than the structural joint such that the jacket means does not interfere with any movement of the joint, and any such movement is translated into strain within a jacket element and/or the or each web element.

23. Apparatus as claimed in claim 1, wherein each optical fibre strain sensor comprises a fibre grating strain sensor.

24. Structural joint strain monitoring apparatus comprising:
jacket means for closely receiving a T-shaped joint between two generally perpendicular structural members to be monitored, said jacket means comprising a T-shaped jacket element of a complimentary size and shape for enclosing at least part of said joint to be received and fixings adapted to fix said jacket element in position around said at least part of said joint, said jacket element comprising a primary hemi-cylindrical part and a secondary hemi-cylindrical part extending generally perpendicularly from said primary hemi-cylindrical part, and a primary web element extending between a first point and a second point on said jacket element; and
a plurality of optical fibre grating strain sensors mechanically coupled at respective measurement locations to said jacket element and said primary web element, said optical fibre grating strain sensors configured to be optically coupled to an optical fibre grating strain sensor interrogation apparatus.

\* \* \* \* \*

UNITED STATES PATENT AND TRADEMARK OFFICE
CERTIFICATE OF CORRECTION

| | | |
|---|---|---|
| PATENT NO. | : 7,660,496 B2 | Page 1 of 1 |
| APPLICATION NO. | : 11/721083 | |
| DATED | : February 9, 2010 | |
| INVENTOR(S) | : Richard Damon Goodman Roberts | |

It is certified that error appears in the above-identified patent and that said Letters Patent is hereby corrected as shown below:

IN THE SPECIFICATIONS:

Column 3, Line 10 (after "BRIEF DESCRIPTION OF THE FIGURES" and before "FIG. 1...")
Insert paragraph from page 4 of PCT Publication No. WO 2006/0604181, as follows:

-- Embodiments of the invention will now be described in detail, by way of example only, with reference to the accompanying drawings, in which: --

Figure 2:
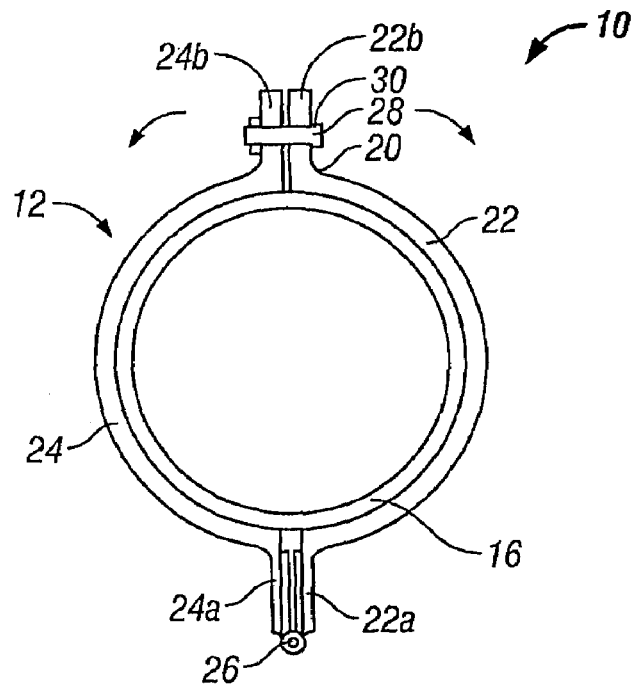
FIG. 2 is a diagrammatic cross-sectional view along line A-A of FIG. 1.

Column 3, Line 37 (after "DETAILED DESCRIPTION OF THE INVENTION" and before "The jacket means...")
Insert paragraph from page 5 of PCT Publication No. WO 2006/0604181, as follows:

-- Referring to Figures 1 and 2, a first embodiment of the invention provides structural joint strain monitoring apparatus 10 which comprises jacket means 12, for location around a structural joint to be monitored, in this example a straight joint between two axially aligned pipes 14, 16, five optical fibre strain sensors 18, which in this example all take the form of optical fibre Bragg gratings (FBG), are provided within an optical fibre 20. --

Signed and Sealed this
Seventh Day of June, 2011

David J. Kappos
*Director of the United States Patent and Trademark Office*